United States Patent [19]

Lestradet

[11] 4,135,594
[45] Jan. 23, 1979

[54] ITINERARY FOLLOWING DEVICE FOR A VEHICLE

[76] Inventor: Maurice Lestradet, 291 rue du Marechal de Lattre de Tassigny, Fere Champenoise, France, 51230

[21] Appl. No.: 746,633

[22] Filed: Dec. 1, 1976

[30] Foreign Application Priority Data

Nov. 28, 1975 [FR] France .............................. 75 36474

[51] Int. Cl.$^2$ ............................................. B62D 5/04
[52] U.S. Cl. ......................................... 180/98; 346/8
[58] Field of Search .......................... 180/79, 79.1, 98; 346/8, 1, 33 R, 138; 340/22, 32; 33/141.5

[56] References Cited

U.S. PATENT DOCUMENTS

| | | | |
|---|---|---|---|
| 1,113,747 | 10/1914 | Boyden | 346/8 |
| 2,248,251 | 7/1941 | Reeves | 180/79.1 |
| 2,598,096 | 5/1952 | Bailly | 346/8 |
| 2,674,332 | 4/1954 | Ovshinsky | 180/79.1 |
| 3,101,175 | 8/1963 | Brown | 180/79.1 X |
| 3,276,137 | 10/1966 | Lore | 180/79 X |
| 3,472,322 | 10/1969 | Barry | 180/79.1 X |
| 3,780,470 | 12/1973 | Roberts et al. | 180/79.1 X |
| 3,840,086 | 10/1974 | Burton | 180/79.1 |

*Primary Examiner*—Kenneth H. Betts

[57] ABSTRACT

The invention concerns a device for recording and reading the itinerary travelled through by a vehicle and in particular an automobile vehicle such as an agricultural machine. The device is adapted to reproduce on an indicator band a trace of the path followed by the vehicle over a given surface so as to enable the operator to follow, with fidelity, in the course of a second passage of the vehicle, the trace of the preceding passage which permits, for example in the case of spraying, a rational treatment of the surface to be treated in strictly parallel strips with no omission or overlapping of zones. The device comprises a programmer constituted by the indicator band which travels at a speed which is proportional to the speed of the vehicle in front of a movable recording element which is controlled by the steering of the vehicle and reacts in accordance with the variations in the steering. The device further comprises a device for reading the recorded program and a device for indicating and displaying the successive directions assumed by the vehicle.

11 Claims, 20 Drawing Figures

ITINERARY FOLLOWING DEVICE FOR A VEHICLE

The invention relates to itinerary-following devices for a vehicle and in particular an automobile vehicle such as an agricultural machine, adapted to permit the vehicle to follow, with fidelity, a previously-recorded line, in the course of a passage of this vehicle over a given surface, these devices being of the type comprising, on one hand, means for recording the path to be followed and, on the other hand, means for comparing the position of the vehicle with the recorded path, in the course of its passage, for the purpose of actuating means for steering the vehicle.

These devices may have a particularly advantageous application in the reproduction on an indicator band of the trace of the path effected by a vehicle over a given surface, so as to permit the operator to follow, with fidelity, the trace of the preceding passage in the course of a second passage of the machine, which permits, for example in the case of spraying, a rational treatment of the surface to be treated in strictly parallel strips with no omission and no overlapping of zones.

The perfect scanning of a surface by a machine, whether it concerns a stretch of water, a surface on land or in the air, is always problematic, since it would be necessary, in order to achieve such a result, to equip the machine with means enabling it to pass over the considered surface scrupulously with no omission of a zone. Now, it is delicate, particularly when the machine moves in media difficult to mark out, to ensure that the different passages of the machine are strictly parallel.

This scanning is still more hazardous when the considered surface has a more or less sinuous shape.

This problem exists in particular in the use of agricultural equipment required to treat, by successive passages and consequently in parallel strips, a surface of land which must be cultivated, that is to say ploughed or sown, or in which plants or vegetables must be treated by spraying. However, this phenomenon is not only encountered in the field of agricultural machinery and it must be understood that, although the present invention refers to this specific case, it also encompasses any other adaptation to vehicles such as reconnoitering aircraft, devices for passing round known obstacles, public works machines, spreaders of any type, such as spreaders of liquid manure, tar, etc...

This is why the object of the invention is to provide a device for following an itinerary in the direction opposed to that in which it was traced and conforming to its initial orientation which is, for example, necessary when the device equips a vehicle whose function is to sweep over a surface in a to-and-fro motion, as is the case in particular of many agricultural machines.

According to the invention, there is provided a device of the aforementioned type which further comprises means for indicating directions successively taken by said vehicle, said comparing means being operative to cause the position of the vehicle to move in the opposite direction to that of the recorded path.

In a particularly advantageous manner, in the case in which the recording means comprise a moving recording surface travelling at a speed proportional to that of the vehicle in front of a movable recording means connected to means for detecting a change in the direction of the vehicle and reacting as a function of its variation and in which the comparing means comprise means for reading the recorded trace connected in the same manner to said detecting means, said comparing means further comprise means for reversing the direction of the moving surface and inserted in the means for driving said surface.

In one embodiment, the moving surface is constituted by an indicator band and the reading means comprises a support which is laterally movable with respect to the indicator band and connected by a linkage and cable system to the pivot of at least one of the steering wheels of the vehicle, said support being provided with a sleeve receiving a writing point which bears on the indicator band by the simple effect of gravity.

According to one feature of the invention, the indicator band is constituted by a roll of blank paper driven by means coupled to one of the wheels of the vehicle, preferably a non-driving wheel, said driving means being connected to the wheel by means of gearing driven by the hub of the considered wheel and transmitting its movement to said driving means.

According to another feature of the invention, the driving means for the indicator band are controlled by a clutch having a selector, whereby it is possible to reverse the direction of travel of the indicator band, the unwinding roll becoming periodically the winding cylinder and vice-versa.

In a specific embodiment of the invention, the indicating means for indicating the successive directions of the vehicle comprise a navigation compass whose dial is replaced by a graduation having two semi-circular numbered and symmetrical areas of different colours.

In a particularly advantageous manner, in the case where the indicating means comprise a graduated magnetic element, the latter is preferably mounted on the vehicle through a support of a non-magnetic material and at a distance from the metal mass of the vehicle which is sufficient to ensure that the magnetic influence of the vehicle is negligible, the indicating means comprising moreover means for viewing from the driving station of the vehicle.

In this way, there is no disturbing influence due to the magnetic field produced by the metal mass of the vehicle, by the battery, by the dynamo or alternator, etc... This influence would otherwise result in sudden variations in the position of the compass which require on the part of the driver a constant attention difficult to sustain for a long time. This arrangement also shields the compass from any aggression due to various products employed on the vehicle and in particular on an agricultural machine.

Preferably, the viewing means comprise, on one hand, a magnifying optical system placed in front of the graduated magnetic element, and, on the other hand, at least one viewing means disposed at the driving station. These means permit a precise reading of the magnetic element without fatigue.

Also in an advantageous manner, the device further comprises means for signalling deviations in the direction of the vehicle from a straight line under the action of at least one means for detecting change in direction. These signalling means enable the driver to read the orientation of the vehicle in a precise manner and consequently to easily maintain the latter on a straight line.

These signalling means may comprise an index which moves in front of a reference under the action of direction change detecting means and through the agency of amplifying means, said signalling means being disposed at the driving station. The amplifying means permit a notable displacement of the index even in respect of small deviations from the direction and therefore enables the straight line to be easily maintained.

In an advantageous manner, the reference may pertain to a graduation disposed on each side of said reference and indicating different steering angles. This arrangement indeed enables the driver to conform to a given interval between a forward passage and a return passage when he reaches the end of the first passage and effects a halfturn.

The signalling means may also comprise two luminous signalling means actuated by direction change detecting means, simultaneously when the detecting means do not detect a change in direction, and separately and respectively when the detecting means detect a change in either direction. The driver must therefore maintain the two signalling means permanently illuminated by appropriate steering, to be sure to effect a passage in a straight line.

The signalling means may also comprise two counting means actuated by a direction change detecting means separately and respectively when the direction change detecting means detect a change in either direction. The driver must also permanently maintain the two counters at the same value by appropriate steering, to be sure to effect the passage in a straight line.

The direction change detecting means are preferably constituted by orientable wheels of the vehicle, in which case there is provided a remote transmission either between the movable recording means disposed at the driving station and the associated orientable wheel, or between the index or the signalling means and also the associated orientable wheel.

The orientable wheel is preferably constituted by a supported and freely rotatable wheel, that is to say a wheel which is neither a steering nor a driving wheel. The use of such a wheel indeed enables the sliding of the vehicle on slopes to be corrected and permits a correct reading of the changes in direction in the recording and reading of bends.

Advantageously, the, or at least one of the, direction change detecting means may be integral with a control jack which is part of the remote transmission. The latter may further comprise a hydraulic or pneumatic circuit in which there is inserted a reversing valve associated with a controlled jack connected to the means to be actuated, which may be, for example, the case of the movable recording means or the signalling index, or an electric circuit comprising a moving contact integral with the control jack and connected to the means to be actuated, which may be, for example, luminous signalling means or counting means.

The invention provides for the possibility of driving the moving recording surface either by a cable transmitting the rotational torque, or by an electronic transmission controlled by means detecting the speed of the vehicle and itself controlling a motor driving said surface.

A device according to the invention is shown by way of a non-limitative example in the accompanying drawings in which.

The device according to the invention may, as mentioned hereinbefore, be adapted to any type of vehicle irrespective of its function or purpose. The following embodiment refers to the application of such a device to an agricultural machine and more particularly to a sprayer for treating plants or vegetables.

It must be understood that this is merely one possible example of application and that, even in the agricultural field, this device could be adapted to any other ground cultivating machine.

The device comprises three parts, namely a programmer, means for reading the recorded program and means for indicating and displaying successive directions assumed by the vehicle equipped with this device.

Figure 1:
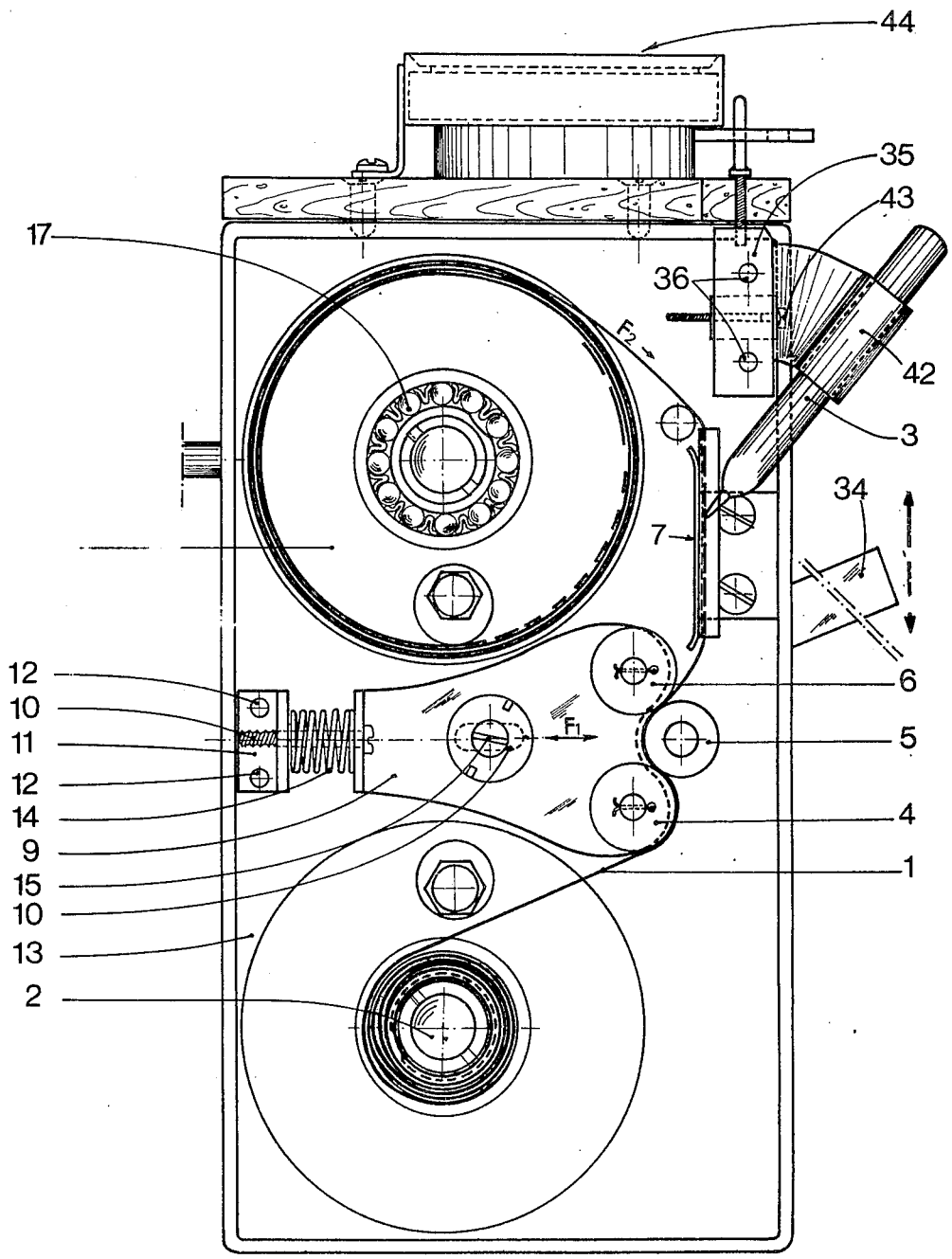
FIG. 1 is a left elevational view of a first embodiment of the device according to the invention.

The programmer comprises, as illustrated in FIG. 1, an indicator band 1 which is, in the considered embodiment, in the form of a band of blank paper unwound by a support roll 8 which will be, as indicated hereinafter, periodically an unwinding roll or a rewinding cylinder. This indicator band cooperates with a movable recording means 3, for example a writing point. The band of paper, unwound from the roll 8 and driven by the cylinder 5, passes into a desk 7, the rollers 4 and 6 of which are assembled on a plate 9 and form pressing means, and is wound onto the cylinder 2, the plate 9 which is movable in reciprocating translation (arrow F) being connected by a bolt 10 to an L-shaped lug 11 fixed by screws 12 to the frame 13 of the device. A compression spring 14 constantly biases the plate in the direction of the driving cylinder 5 so that the two tensioning rollers 4 and 6 are permanently applied against said cylinder.

Figure 3:
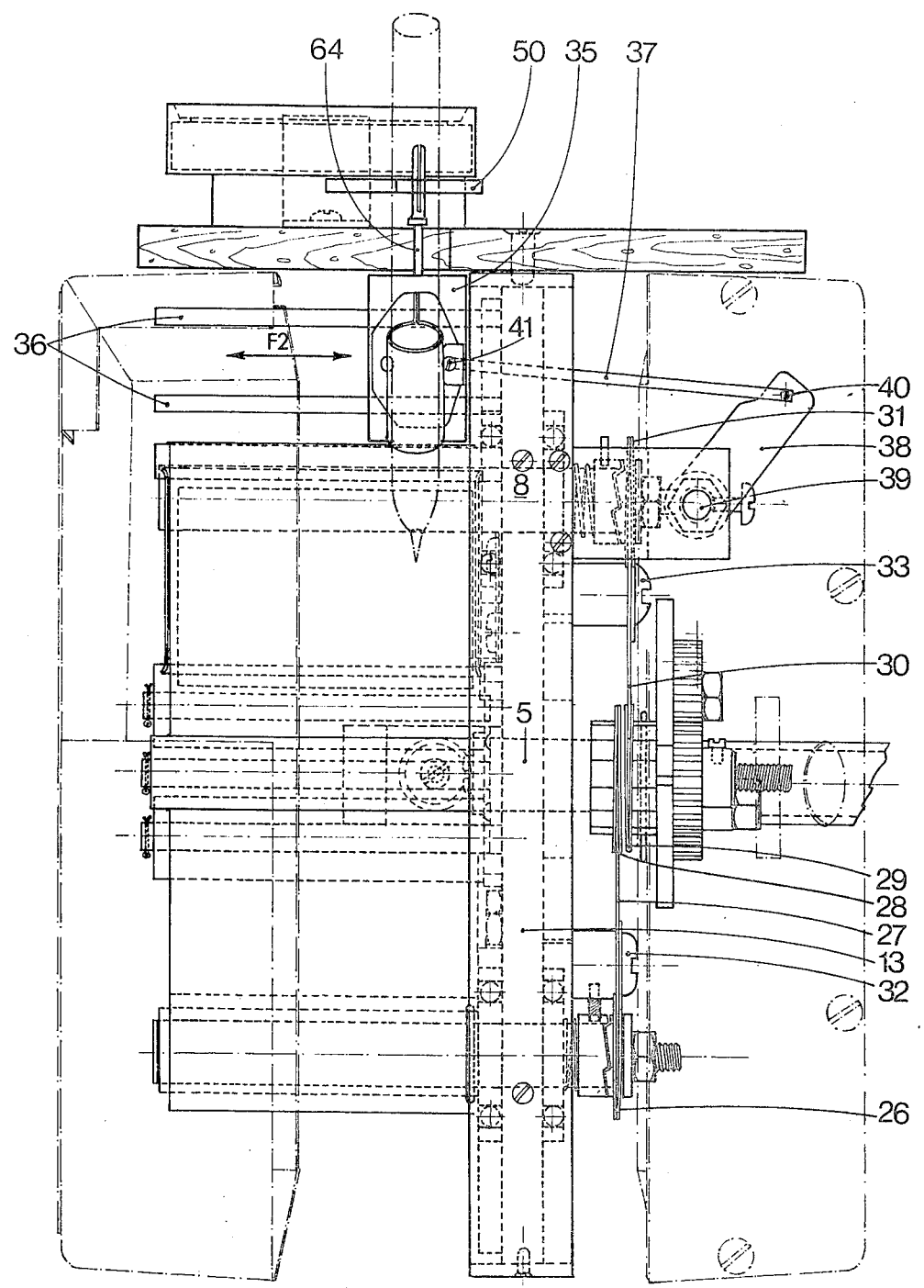
FIG. 3 is a front elevational view thereof.

The plate 9 is displaced by a sliding of a fixing screw 15 in an oblong opening 16. The desk is constituted by an exactly planar metal plate acting as a writing desk for the writing point 3. The unwinding roll 8 and the rewinding cylinder 2 are both mounted on ball bearings 17 which facilitate their rotation. The roll and cylinder are mounted on the frame 13 which is in the form of a rigid support unit seen in particular in FIG. 3.

Figure 2:
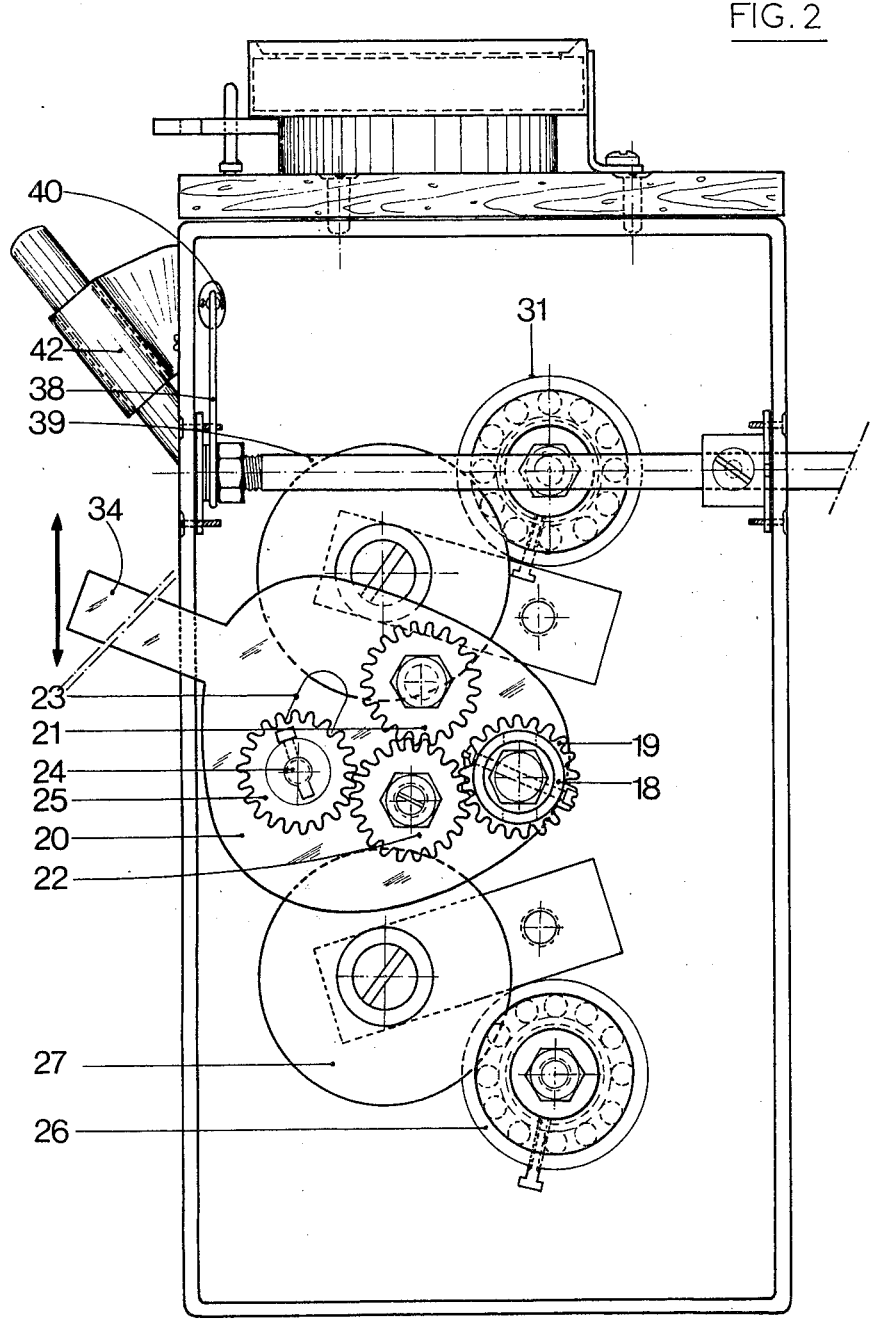
FIG. 2 is a right elevational view thereof.

Mounted on the side of the frame opposed to that illustrated in FIG. 1, are the means for driving the indicator band. These means (FIG. 2) are constituted by a clutch having a selector and a friction-disc transmission.

A driving shaft 18 is coupled through a cable system to a movement take-off (not shown) known per se. It concerns in fact a gear mounted on one of the wheels of the vehicle which is preferably a supported wheel so as to avoid taking the speed from a driving wheel which is subject to slip, said gear transmitting the movement of rotation from the wheel to said driving shaft 18. The base of the shaft 18 is provided with a sun gear 19 connected to rotate with the shaft 18. The selector is constituted by a selecting plate 20 carrying two freely rotatable planet gears 21 and 22, this plate being provided with a curvilinear slot 23 in which a rotary shaft 24 carrying a second sun gear 25 is slidable. In this way it is possible to interconnect the two sun gears 19 and 25 by a selective utilization of either of the two planet gears 21 and 22. Thus, if the transmission is through the set of gears 19, 22 and 25, the indicator band is driven in one direction whereas if the transmission occurs through the set of gears 19, 21 and 25, the band is driven in the opposite direction. This reversing selector therefore imparts a reversible character to the driving means for the indicator band.

The shaft 24 carrying the sun gear 25 supports the driving roll 5 which is seen in FIG. 1 and is connected to rotate with this shaft. The periphery of the roll is coated with rubber so as to permit a frictional drive of the indicator band which is intended to pass in front of the desk 7 and consequently in front of the writing point 3. The cylinder 2 and the roll 8 are also driven in rotation by a friction transmission constituted by discs 26 to 31 respectively carried by each one of these two members and by additional shafts serving to secure transmission discs.

Indeed, it can be seen that the unwinding roll has a pair of discs 26 (FIG. 3) which pinch therebetween the transmission disc 27 carried by the shaft 22, this disc 27 being pinched between the pair of discs 28 carried by the shaft of the driving cylinder 5, this shaft also having a pair of discs 29 pinching therebetween a second transmission disc 30 carried by the shaft 33, this transmission disc being itself pinched between a pair of discs 31 carried by the shaft of the rewinding cylinder 2.

In this way the unwinding roll 8, the driving cylinder 5 and the rewinding cylinder 2 are kinematically interconnected by two transmission discs 27 and 30 which are freely rotatable on their respective shafts 32 and 33.

It will be understood that the direction of rotation of these discs is also reversed in accordance with the position of the selecting plate 20 and in accordance with the selected set of gears interengaged. This selecting plate performs the function of a clutch and has a neutral position which corresponds to a substantially horizontal position of the lever 34, in which position the sun gear 25 is connected with neither of the two planet gears 21 and 22. In this case, the indicator band is not driven.

The recording device comprises, as indicated hereinbefore, a writing point 3 adapted to reproduce graphically on the indicator band 1 which moves in front of its desk 7 the trace of the itinerary travelled through by the vehicle to which this device is applied.

The particularity of this recording device resides in the fact that it is movable laterally (arrow $F_2$, FIG. 3) in a plane perpendicular to the direction of movement of the indicator band 1. For this purpose, the recording means is constituted by a support 35 which is slidably mounted on slideways 36, this support 35 being connected by a linkage 37 to an arm 38 which is angularly movably mounted on a shaft 39 which is connected through a cable system to the pivot of the steering wheel. The arm 38 is connected to the slidable support 35 by a linkage 37 which is pivoted by its end 40 to the arm and connected by its end 41 to the movable support 35.

This support comprises a cradle 42 secured to the front face of the support by screws 43, this cradle being in the form of a cylindrical sleeve in which the writing point 3 is engaged, the writing point bearing, simply by the effect of gravity, on the desk 7 along which the indicator band moves.

In order to produce the graph on the indicator band, the sleeve 42 is inclined at an angle of about 45° so that the angle of incidence of the writing point on the indicator band is suitable for writing. It is obvious that the recording means could be subjected to trust means in order to improve the contact between the paper and the writing point.

The reading means are constituted by a dry point which is substituted for the writing point and has for purpose to read, and consequently exactly follow, the graph recorded by the writing point.

The means for indicating and displaying the successive directions taken by the vehicle are constituted by a compass 44 whereby it is possible to define the geographic orientation of the vehicle. This compass 44 comprises a rotatable dial the cardinal points of which have been replaced by two semi-circular areas numbered, for example, from 5 to 60, one area being in a light zone and the other in a dark zone, each number having a rather fine line to ensure the precision of the positioning of indices 49 and 50. Concentrically and independently of the compass 44, two toothed rings 51 and 52, of which one supports the index 49 and the other the index 50, are each actuated by a knurled knob 62 and 63 for placing the indices on the numbers marking the departure and the arrival of the path to be recorded. A ring 46 which always has for its centre the axis of the compass 44 and comprises a reference 0 and a tab 53 driven by the shaft 64 (FIG. 3), indicates the position of the steering wheels of the vehicle. An index 45, marked on a fixed outer ring 47, permits locating the 0 and possibly measuring the steering angle of the wheels. The fixed outer ring 47 carries the index 45 which is also fixed. A retaining formed-over member 48 maintains the assembly assembled.

Figure 6:
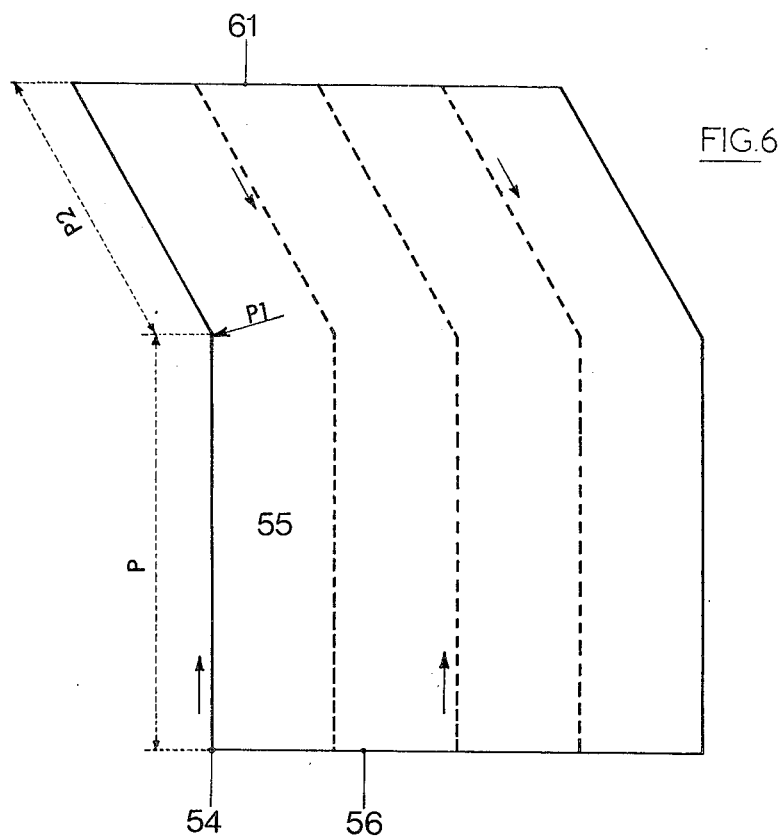
FIGS. 6 and 7 are diagrams illustrating respectively the contour of the surface to be treated and the graph corresponding to this surface.

The device operates in the following manner:

In order to illustrate the process of utilization of the previously-described device, there has been chosen, in accordance with FIG. 6, a surface to be treated which has been divided into parallel but non-rectilinear strips. The principle therefore consists in arranging that the strips treated by the vehicle in the course of its successive passages are strictly parallel and that there are consequently no omitted or overlapping zones.

According to this example, the vehicle is placed on the edge 56 of the field in the vicinity of the extreme left corner 54 so that the first portion, corresponding to the strip 55, is treated. In the position of departure, the orientation of the field, and consequently the direction that the vehicle will take, is observed by means of the compass 44. The index 49 is then placed on the FIG. 30 of the black zone, assuming in the considered example that this figure indicates exactly the North and that the direction of the vehicle is on the 0.

Figure 7:
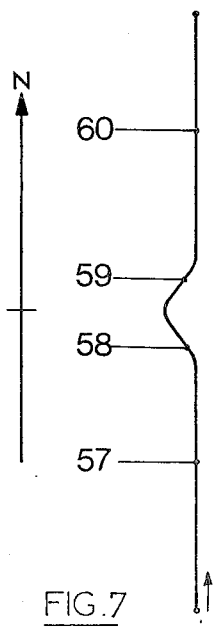

The vehicle will thus follow, on a part P of the path, a strictly rectilinear trajectory so that the writing point 3 will trace on the indicator band, driven at a speed which is proportional to the speed of the vehicle (arrow $F_2$, FIG. 1), a straight line 57 (FIG. 7). In this part of the path and in the absence of a turning of the steering wheels, the display of the index 49 on the reference 30 will remain constant.

When the vehicle reaches the corner $P_1$, the driver will have to steer the wheels to follow the new direction that his vehicle must take. At this moment, the turning of the steering wheels causes the lateral displacement of the recording means so that the trace corresponding to this steering will be inscribed in the form of an oblique line 58 (FIG. 7) corresponding to the combination of the transverse displacement of the recording means and the longitudinal displacement of the indicator band.

When the driver turns the steering wheels back to bring his vehicle onto a straight line and engage it on the second part $P_2$ of the path, the writing point records this new change in direction by the inclined trace 59, after which the vehicle will resume the straight line with no other change in direction in the second part of the ground which will correspond to a rectilinear trace 60 (FIG. 7).

Figure 4:
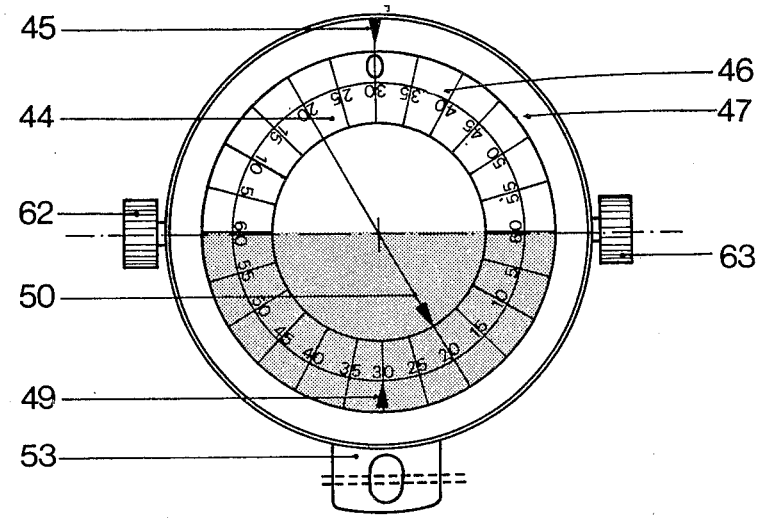
FIGS. 4 and 5 are respectively plan and partial sectional views of indicating and display means.
Figure 5:
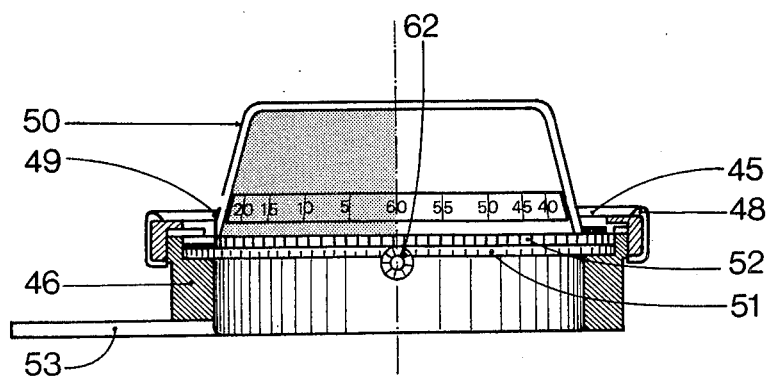

When the vehicle has reached the opposite edge 61 of the field, the index 50 is placed on a number of the black zone as shown in FIG. 4, for example the number 20, this number is taken from another indicator, the ground is marked out in such manner as to place the vehicle on a new base of departure contiguous to the treated strip 25, and the selector 20 is released.

Figure 20:
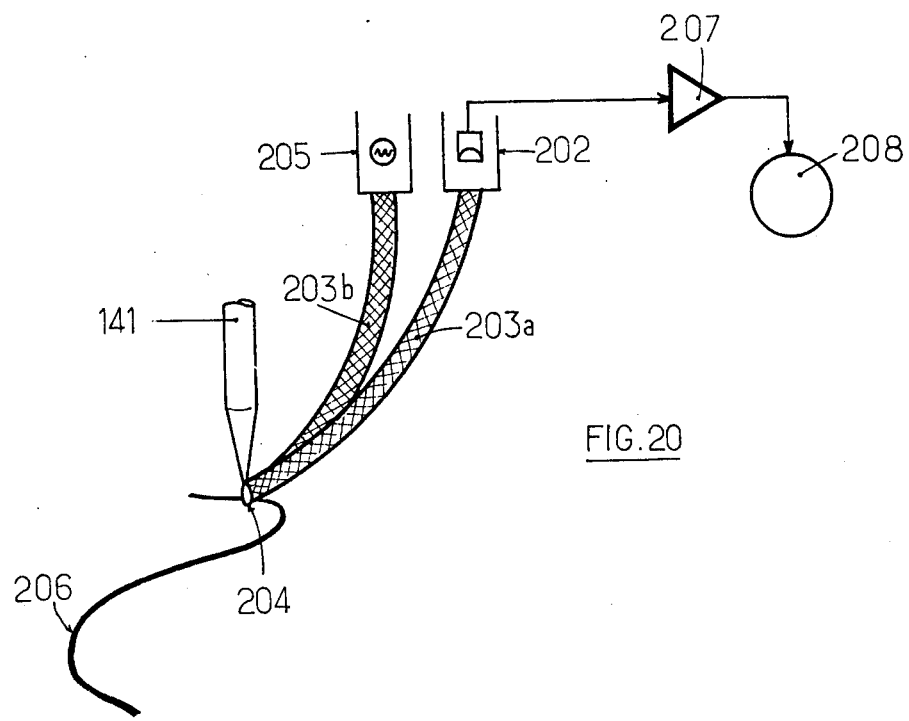
FIG. 20 is a diagrammatic view of a complementary controlled reading device.

After the vehicle has made a half-turn and is in the return position, it is ensured that the vehice is oriented in the direction 0 and that the FIG. 20 of the white zone is strictly on the index 50. Indeed, as the vehicle has turned through 180°, the indication effected in the black zone is in the white zone, that is to say in the direction opposed to the preceding passage. A dry point is substituted for the writing point 3 for following the previously recorded trace, the direction of unwinding of the paper being reversed by means of the selector 20 before starting up.

This programming-reading device therefore enables the operator to treat the surface in strictly parallel strips which avoids any omission of a zone or any waste inherent in overlapping zones.

It will be understood that the programmer employed could be other than graphical, for example it could concern a luminous optical or sound recorder employing possibly the well-known process of cinematographic sound reproducers or readers. Moreover, it is possible, in order to program the itinerary, to employ a survey plan or any other means such as a cartographical itinerary.

The invention finds its application in automatically-piloted machines. It is sufficient in this case that the device be equipped with a servo control associated with the programmed band.

This device which is by way of example mechanical may of course operate either:
electrically by voltage variation;
electronically by frequency variation;
electromagnetically by magnetic field variation;
optically by light variation on photoresistive cells, or
hydraulically with the use of transmission jacks.

Figure 8:
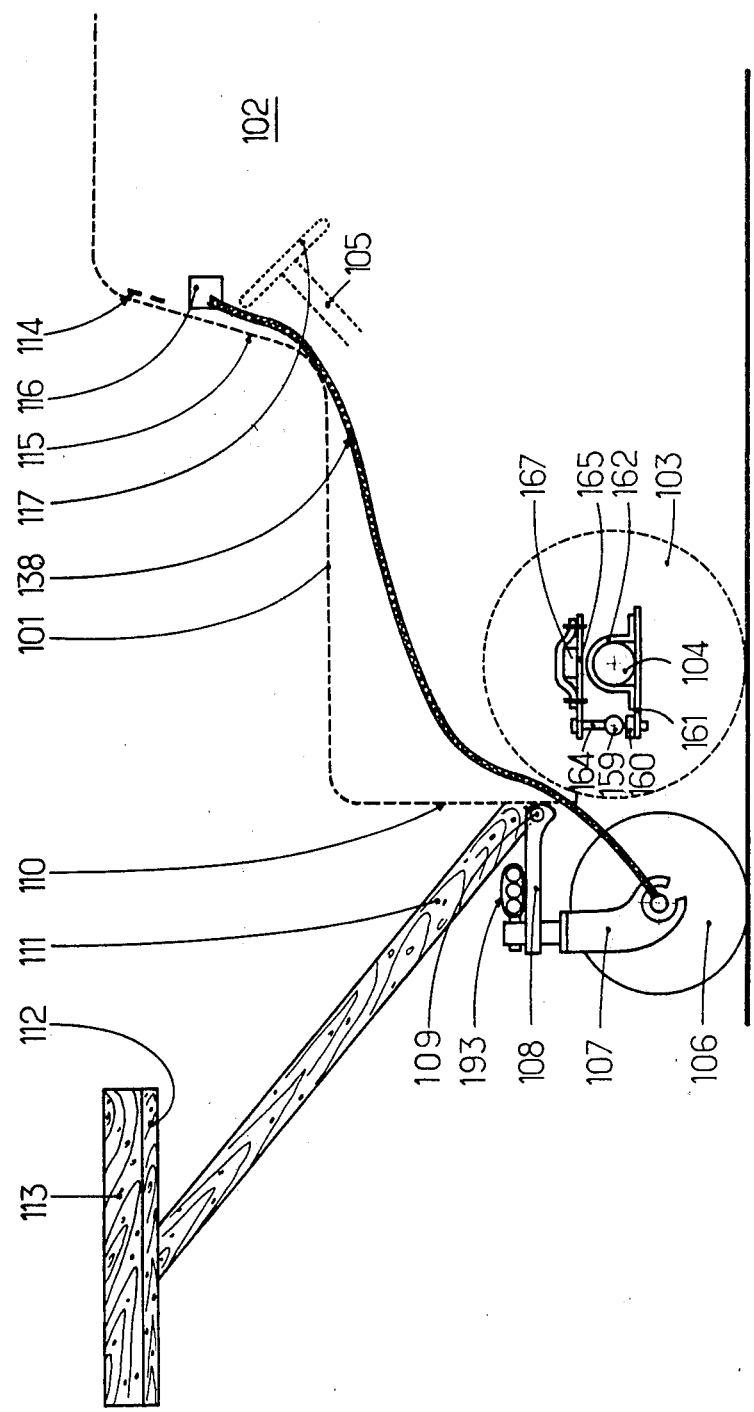
FIG. 8 is a general diagrammatic side elevational view of a device according to a second embodiment of the invention equipping an agricultural machine such as a sprayer.

The agricultural machine, such as a sprayer, shown in FIG. 8 comprises a support assembly 101 constituted generally by a chassis and a body at the front of which there is located a driving station 102. This support assembly is mounted, also at the front, on two steering wheels 103 which are interconnected by an axle 104 and are steerable by a steering system 105. Also provided at the front of the machine is a third wheel 106 which is neither a steering wheel nor a driving wheel and is merely carried, through the agency of an offset fork 107, by a roughly horizontal support 108 which is mounted to be pivotable about a transverse horizontal axis 109 on the front face of the support assembly 101 and extends forwardly.

The same front face 110 of the machine also carries in a fixed manner a support structure 111 which extends forwardly and upwardly at about 45° and has an end which carries a horizontal platform 112 on which a protecting tunnel 113 is fixed. Disposed in the latter are viewing means which are represented in more detail in FIG. 9 and are completed by two eye-pieces 114 mounted on the recording and reading apparatus 116 which is secured to the frame of the windscreen 115 above the steering wheel 117 pertaining to the steering system 105. The length of the support frame 111 is such that the platform 112 and the indicating means carried thereby are disposed at a distance of about 3 m from the mass of the support assembly 101 of the machine. This frame 111 is constructed from a non-ferrous material, such as for example wood. The tunnel 113 is disposed roughly on the longitudinal axis of the machine.

Figure 9:
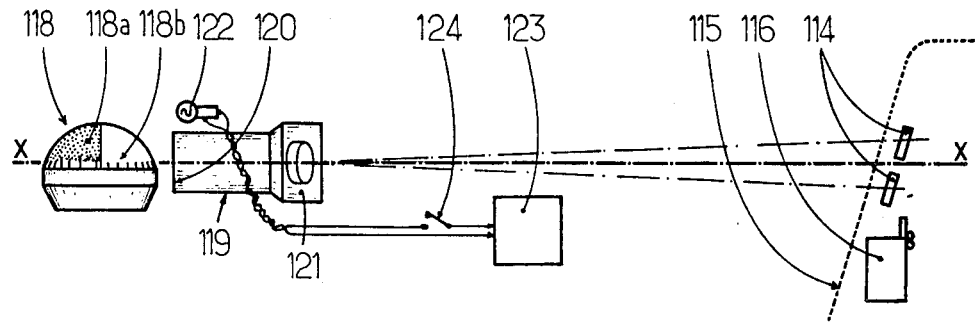
FIG. 9 is a diagrammatic side elevational view to an enlarged scale of the indicating means of this device.

As shown in FIG. 9, the indicating means contained in the tunnel 113 comprise, on one hand, a navigation compass 118 in the form of a spherical dome and, on the other hand, an optical system 119 which is aligned along the longitudinal axis X—X connecting the centre of the compass to the eye-pieces 114. The compass 118 is constituted by a conventional navigation compass which is mounted on a pivot in a case fixed to the platform 112, the compasscard of which is replaced by two 180° sectors 118$a$ and 118$b$ of different colours, for example black and red, and each finely graduated in 100 divisions exactly corresponding to the 100 divisions of the opposite sector. The optical system 119 is constituted by a magnifying objective lens which may be of any suitable conventional structure, comprising for example a fine central vertical line 120 and an assembly of two lenses of which one is bi-convex and the other convex-concave 121. An illuminating lamp 122 is disposed in the vicinity of the graduations of facilitate the reading thereof, the tunnel 113 which is open adjacent the driving station limiting the reflections of the outside light. Placing the compass very far in front of the mass of the machine puts this compass outside the parasitic magnetic influence of the machine. The lamp 122 is supplied with current by the battery 123 of the machine through a switch 124.

Figure 10:
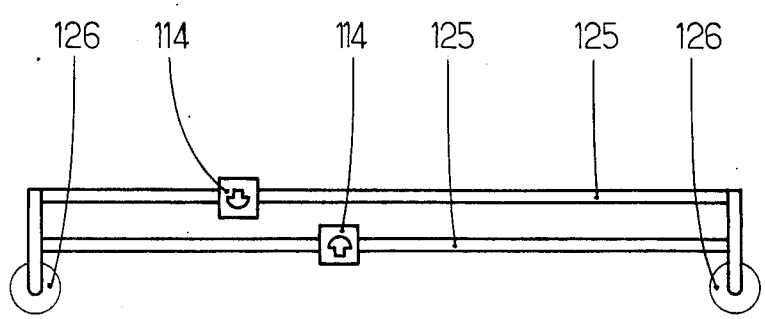
FIG. 10 is a front elevational view of the viewing means of the indicating means of FIG. 9.

As shown in FIG. 10, the eyepieces 114 are respectively slidably mounted on guide rods 125 which are fixed, in horizontal and transverse positions a short distance apart one above the other, on the case of the apparatus 116 by support feet 126.

It would also be possible to arrange the compass-dial in the flat condition, in which case the optical system would further comprise a reflecting prism disposed above the graduations.

Figure 11:
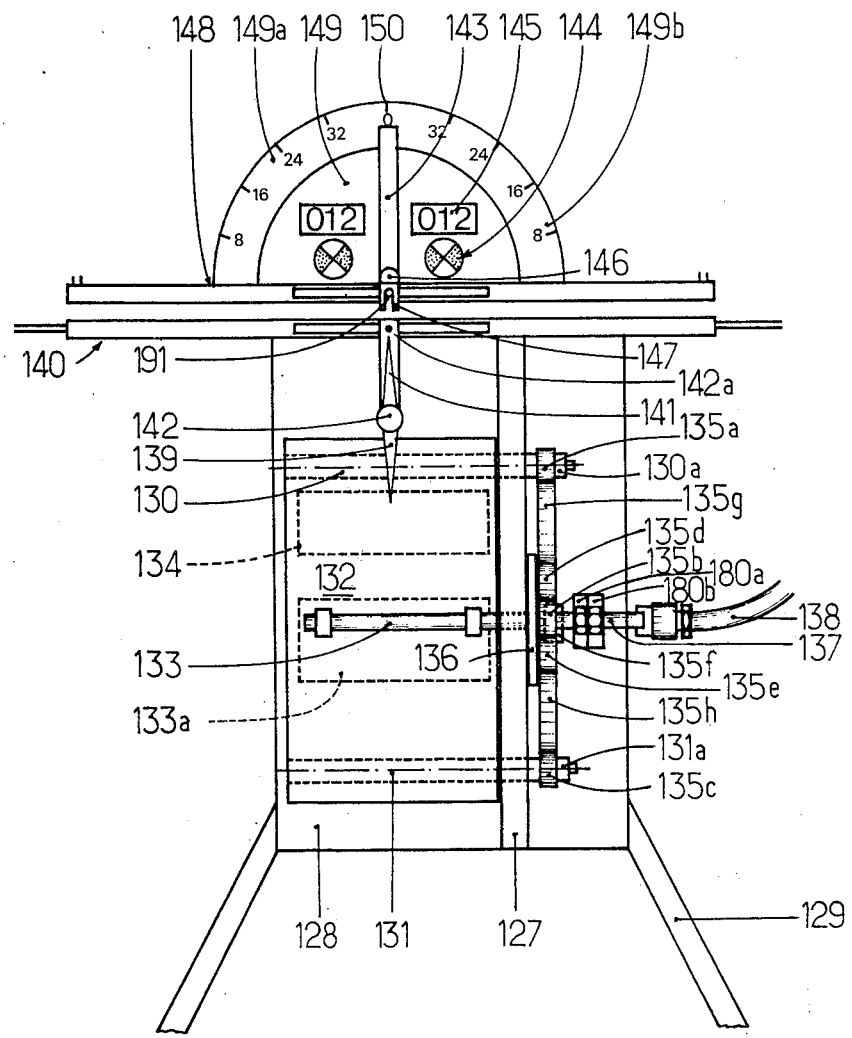
FIG. 11 is a diagrammatic front elevational view of the recording means and the signalling means according to the invention.

As shown in FIG. 11, the recording and reading apparatus comprises a vertical plate 127 which is oriented in the direction of the axis of the machine and secured to a base 128 which is also vertical but extends transversely and is mounted by a frame 129 in front of the driving station 102.

The plate carries three support shafts disposed one above the other. The two end shafts 130 and 131 receive the two rolls constituting a band of paper 132 or other material suitable for recording a trace, whereas the third shaft 133 carries two rollers which bear against the outer surface of the band 132 and apply the latter against pressing rollers assembled on a spring-biased L-shaped plate 133a. Located adjacent the plate 133a is a desk 134 carried by the base 128. The three shafts are driven by a gear train comprising three driving gears 135a, 135b and 135c respectively disposed on the ends of the shafts 130, 133 and 131. Two selecting gears 135d and 135e are freely rotatably mounted on a pivotal lever 136 which has the same shaft as a driving gear 135f and is disposed at the rear of the gear 135b. The movement of the lever 136 is such that it permits bringing the gears 135d and 135e selectively, that is to say either gear, into engagement with both the gears 135b and 135f. The end of the shaft 133 which carries the gear 135b extends freely through the lever 136 through a slot in the shape of an arc of a circle. This assembly permits, by a simple shifting of the lever 136, a driving of the rollers of the shaft 133, and consequently, of the band of paper, in either direction.

The same is true of the shafts 130 and 131 and therefore of the end rolls of the band, the gears 135a and 135c being driven by intermediate gears 135g and 135h, with the gear 135g engaged with the gear 135d or the gear 135h engaged with the gear 135e, depending on the position of the lever 136, so that it is either the shaft 130 or the shaft 131 which is driven. The driving gear 135f is keyed on a shaft 137 which has its other end integral with a head block of a cable 138 of conventional type transmitting the torque. This recording apparatus is completed by a writing point 139 which is disposed in front of the band of paper 132 and is applied against the latter in the region of the desk 134 under the effect of gravity but is connected to a control jack 140 which will be described in more detail hereinafter. This writing point 139 may be replaced by a reading point 141 by a simple rotation through 180° of a fixing knob 142 on a support 142a. The pivotal lever 136 enables the band of paper to be displaced in both directions (winding and unwinding). This lever can also assume a third, neutral, position. The driving gears 135a and 135c are mounted on the shafts 130 and 131 by annular friction means 130a and 131a which result in a flexible winding and unwinding drive with no excessive tension. The cable 138 is enclosed in a flexible sheath and secured at its other end, as shown in FIG. 8, to the shaft of the supported wheel 106 and thus transmits the rotation of this wheel to the recording apparatus in which the paper is consequently unwound at a speed proportional to the travelling speed of the vehicle.

FIG. 11 also shows an assembly of signalling means comprising an index 143, two signalling lamps 144 and two counters 145, the assembly being disposed above the previously described recording apparatus. The index 143 is constituted by the larger arm of a two-armed lever which has a precise locating index and is pivotably mounted on a shaft 146. The other arm 147 of the index 143 is markedly shorter and can be shifted by a second control jack 148 which will be described in more detail hereinafter. The index 143 is located in front of a semi-circular dial 149 which is vertically and transversely disposed with respect to the machine, this dial having in the middle thereof and in its upper part a reference 150 marked O and, on each side of the latter, two symmetrical graduations 149a, 149b comprising steering diameter values expressed, for example, in meters and varying, for example, of course in the decreasing order of diameters from 32 meters to 8 meters.

Figure 12:
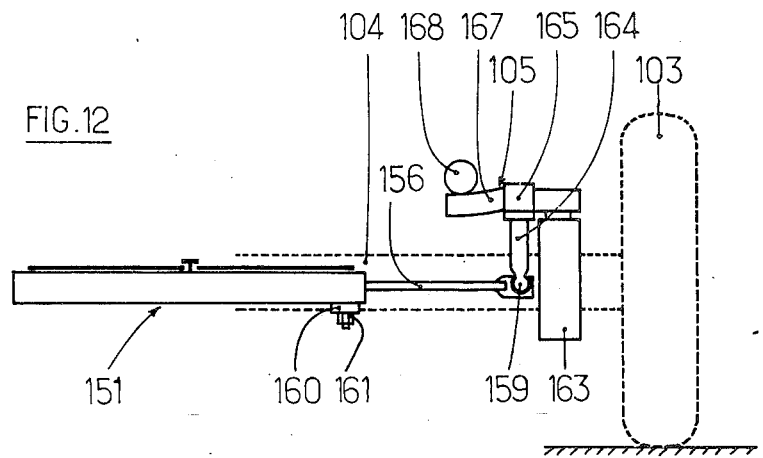
FIG. 12 is a partial front elevational view of the machine shown in FIG. 8 limited to the region of a steering wheel and the control jack associated with the latter.
Figure 13:
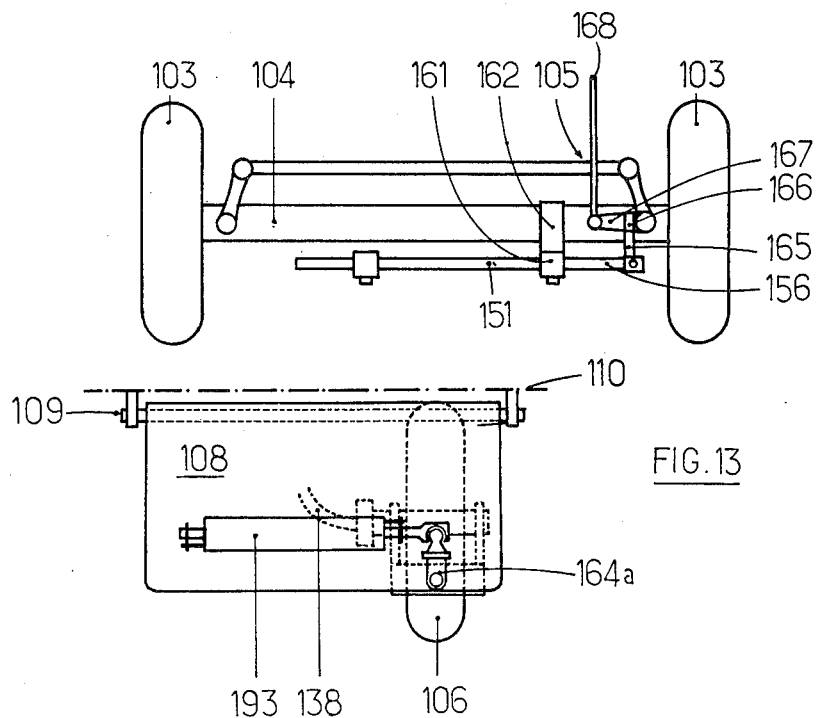
FIG. 13 is a partial bottom plan view of the same machine limited to the region of the two steering wheels and an additional supported wheel also equipped with a control jack.

As shown in FIGS. 8, 12 and 13, a control jack 151 is mounted on the front axle 4 of the machine to be actuated by the steering system 105 of the latter.

Figure 14:
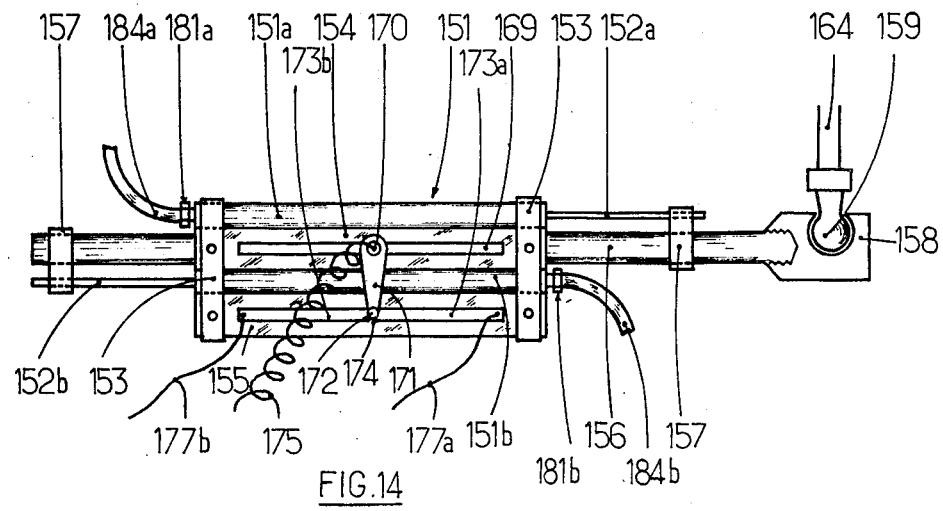
FIG. 14 is a view to an enlarged scale of the details of the control jacks of FIGS. 12 and 13.
Figure 15:
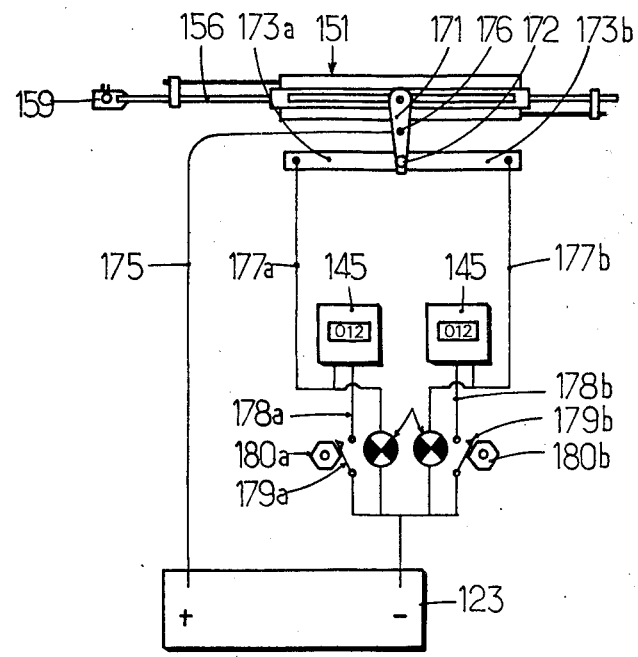
FIG. 15 is a diagram representing the electrical circuit for controlling certain signalling means by the control jack associated with the steering wheel.

As shown in FIG. 14, this jack 151 is a double jack consisting of two single-acting jacks 151a and 151b which are disposed in a parallel and reverse relation to each other, that is to say with their rods 152a and 152b extending in opposite directions. These jacks are connected at their ends by two supporting cross-members 153 which are moreover united by two longitudinal bars, of which one bar 154 is disposed between the two jacks and the other bar 155 is disposed beyond one of the jacks. Disposed below the bar 154 and between the two jacks is a long control rod 156 on which there are secured, by collars 157, the ends of the jack rods 152a and 152b. One of the ends of the rod 156 carries, beyond the collar 157, a fixing block 158 which receives a ball-and-socket joint 159. This assembly is mounted on the axle 104 in such manner as to be parallel to and in front of the latter, owing to the provision of a pivotable support block 160 which is secured on one hand under the jack and on the other hand on a bracket 161, which is perpendicular to the jack, that is to say extends longitudinally of the machine, and is secured to the axle by a collar 162. The rod 156 extends towards one of the steering wheels 103 so that the wall-and-socket joint 159 is located roughly at the height of the pivot 163 of this wheel. The ball-and-socket joint 159 is provided at the end of the rod section 164 which extends vertically upwardly and is connected through a horizontal link 165 to an intermediate point 166 of a control arm 167 which shifts the pivot 163 under the control of the steering rod 168. Consequently, this assembly ensures that the turning of the steering wheels 133 by means of the steering system 105 simultaneously shifts the rod 156 and the jack rods 152a and 152b secured to the rod 156.

FIG. 14 also shows, in association with FIG. 8, that there is associated with the control jack 151 described hereinbefore an electric circuit for actuating signalling means constituted by the two lamps 144 and the two counters 145. The bar 154 has indeed a longitudinal slot 169 which is disposed above the bar 156 and in which there is movable a finger member 170 which is integral, on one hand, with this rod and, on the other hand, with an arm 171 which is electrically insulated and perpendicular to the slot and carries at its end a moving contact 172 constituted by a silver block and located above the bar 155. The latter is insulated and has on its length two conductive areas 173a and 173b which are in alignment and separated only by a gap 174 which is capable of being covered by the block 172 when the moving part of the jacks is in the median position, that is to say when the steering wheels of the vehicle are in the straight-ahead position. An electric conductor 175 connects an intermediate point 176 of the arm 171 which is connected to the block 172, to a terminal of the battery 123, whereas two other conductors 177a and 177b respectively connect the outer ends of these areas 173a and 173b in parallel to the other terminal of the battery.

The two signalling lamps 144 are inserted in each of the conductors 177a and 177b and, connected in parallel with each of these lamps, is a line 178a or 178b in which there is inserted one of the two counters 145 and a switch 179a or 179b. The counters 145 are, for example, electric or electromechanical counters counting in both directions of conventional type. They may also be mechanical counters. The two switches 179a and 179b are disposed in the vicinity of, and facing, the edge of two six-sided cams 180a and 180b which, as shown in FIG. 14, are fixed side-by-side on the shaft 137 driven in rotation by the cable 138. As a result of this arrangement, when the steering wheels are in the straight-ahead direction, the silver block comes in contact with both of the two areas 173a and 173b and closes the two parallel circuits and, on one hand, simultaneously illuminates the two lamps 144 and, on the other hand, simultaneously causes the advance of the two counters 145 as the cams 180a and 180b allow through pulses in the branches 178a and 178b by actuating the switches 179a and 179b. On the other hand, if the steering wheels are turned to the left or to the right, the bar 156 is shifted in the same direction and the same is true of the silver block 172 which is then in contact with only one of the two areas 173a and 173b so that a single one of the two lamps 144 is illuminated and only the corresponding counter 145 has its displayed number or indication increased.

Figure 16:
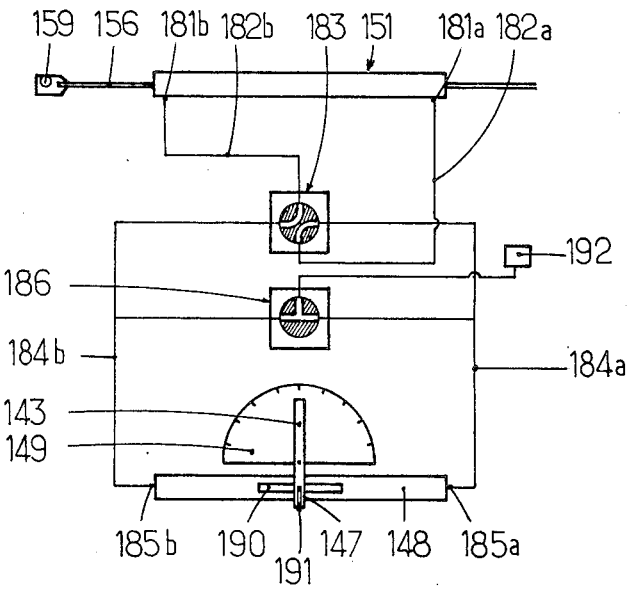
FIG. 16 is a diagram of the hydraulic circuit for controlling the signalling index by the jack associated with the steering wheel.

As shown in FIG. 16, the same control jack 151 is associated with the signalling index 143.

As shown in FIG. 14, each of the jacks 151a and 151b has at the end opposed to its rod a fluid outlet 181a or 181b, these two outlets being connected by two pipes 182a and 182b to two of the inlets of a four-way inverting valve 183 whose two outlets are connected by two other pipes 184a and 184b to two fluid inlets 185a and 185b located at the two ends of a control jack 148.

Figure 17:
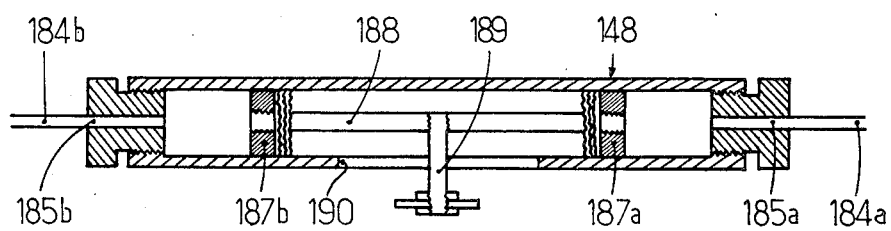
FIG. 17 is a view to an enlarged scale of the control jack of the circuit of FIG. 16.

As shown in more detail in FIG. 17, this jack has internally two pistons 187a and 187b interconnected by a central rod 188 the middle of which is integral with a radial arm 189 perpendicular to this rod and extending through a longitudinal slot 190 formed in the cylindrical wall of the jack body so that its end portion, located outside the jack body, engages in a notch 191 formed in the end portion of the second arm 147 of the lever constituting the index 143. The chambers of the jacks 151 and 148 and the pipes 182a, 182b, 184a and 184b are filled with a hydraulic fluid, this circuit being completed by a three-way valve 186 of which two inlets are respectively connected to the pipes 184a and 184b and the third inlet is connected to a fluid tank 192. The valve 186 enables the index 143 to be centred on the reference 0 of the dial 149 when the steering wheels are in the straight-ahead position. The opening of the valve also avoids the compression or the retraction of the fluid, which is for example constituted by oil, when there are wide temperature variations, in particular during prolonged immobilisation of the machine. The apparatus is of course in the operating state when this valve is closed, after the setting of the index.

The four-way valve 183 enables the movement of the index to be reversed when the machine must effect a return passage. It could be arranged to actuate this valve 183 by means of the lever 136 having three positions so as to simplify the operation.

As shown in the Figures, there is also provided a second control jack 193 which is associated with the supported wheel 106 and is disposed on the pivotable support 108 of the latter. This support 108 is in the form of a horizontal plate which extends to a marked extent on one side of the vertical pivot of the wheel. This jack 193 has a structure identical to that of the double jack 151. However, it does not have the electric circuit components corresponding to the arm 171 and the areas 173a and 173b of the jack 151. The ball-and-socket joint associated with the jack 193 is carried by an arm 164a similar to the arm 164, the other end thereof being connected to rotate with the vertical pivot shaft of the wheel. With this arrangement, when the wheel 106 turns about this pivot shaft, the jack is shifted in either direction with respect to its median position.

Figure 18:
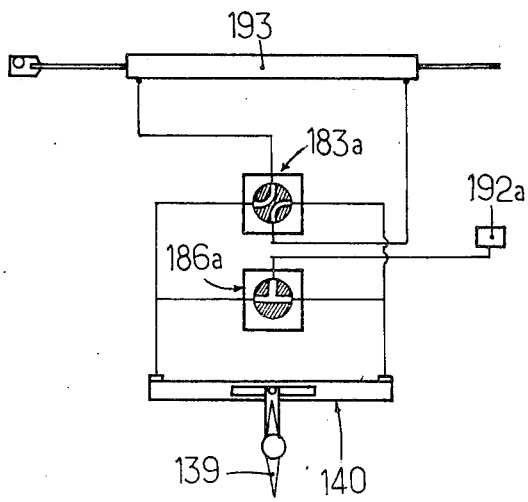
FIG. 18 is a diagram of the hydraulic circuit for controlling the movable recording means by the jack associated with the additional supported wheel.

As shown in FIG. 18, the jack 193 is inserted in a hydraulic circuit similar to that shown in FIG. 9, that is to say it comprises, in particular, a four-way valve 183a, a three-way valve 186a and an oil tank 192a, this hydraulic circuit being closed on the ends of the control jack 140 which is also shown in FIG. 4 and drives the writing point 139. This controlled jack 140 has a structure identical to that of the jack 148 except that the radial arm corresponding to the arm 189, instead of being engaged in a notch, has its end portion directly secured to the support 143 of the writing point. The three-way valve 186 enables the writing point 139 to be previously centred on the paper of the recording apparatus when the supported wheel 106 is oriented in the straight-ahead position. The arrangement is such that when this wheel is oriented or turned to the right or the left, its vertical pivot shaft drives the common rod of the double jack 193 and the latter causes, through the agency of the hydraulic circuit, a displacement of the double piston of the jack 140 and consequently of the writing point 139 to the right or the left.

Figure 19:
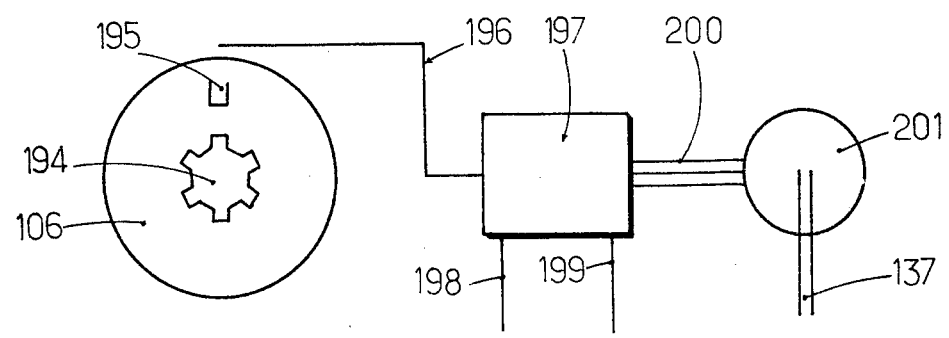
FIG. 19 is a view of a modification including an electronic control circuit for driving the moving recording surface.

FIG. 19 illustrates a modification of the driving of the paper of the recording apparatus by the rotation of the supported wheel 106. For this purpose, the latter carries on its hub a pole wheel 194 of small size the poles of which pass in succession in front of a static contact 195 which is connected through an electric conductor 196 to the input of an electronic control unit 197 having means for controlling forward operation 198 and means for controlling reverse operation 199, the output of this unit 197 being connected through a cable 200 to a step-by-step motor 201 which is keyed at the place of the head block of the cable 138 on the shaft 137 driving the recording apparatus. With this arrangement, the step-by-step advance of the motor 201 is brought about by the contact 195, the angular position of the positioning of the paper given by the motor depending on the number of steps provided by the pole wheel 194 (taking into account the direction of travel of the machine determined by the controls 198 and 199 which are, for example, connected to the lever changing the direction of travel).

The control of the guiding may be achieved by replacing the manual and visual action of the driver by an automatic reading, and in particular an opto-electronic reading, of the trace previously recorded on the band of paper, and an automatic action on the steering system of the machine through driving means furnishing power to the column of the steering wheel or any other device acting on the steering means. This device may be constituted by a detector which reacts on the steering driving means and comprises, for example as shown in FIG. 20, a photoelectric cell 202 which is disposed at one end of a fibre optics 203a the other end of which is supported by the end of the reading point 141 of the recording apparatus (disposed in place of the writing point 139) above the trace 206 previously formed on the band of paper. The trace is illuminated by a second fibre optics 203b of which one end is disposed in front of an illuminating lamp 205 provided with a concentrating lens and the other end is also secured to the reading point 141. The photoelectric cell is electrically connected to the input of a control unit 207 whose output controls a motor 208 which drives the steering wheel, or any other steering means, and reacts on the motor in such manner that the latter turns this steering wheel, or other steering means, and consequently shifts the reading point so that the latter always remains on the trace 206. The utilization of a fibre optics for transmitting the light to the cell has the advantage over a simplified arrangement in which the cell would be disposed directly on the reading point and facing the trace, of having a fixed cell and clearing the area around the reading track and consequently allowing the operator to effect a visual checking thus, if reading point 141 is above trace 206 the trace is lit but still less bright than the surrounding paper, therefore, cell 202 reads a low illumination; if reading point 141 is away from the trace, cell 202 reads a higher illumination which then acts so as to servo motor 208 to bring the reading point back over the trace.

The operation of the device just described will now be briefly described.

The control jacks and the moving contact are first set in their central position when the steering wheels of the vehicle are exactly in their straight-ahead position, so that the index 143 is on the reference 0, the two signalling lamps 144 are illuminated and the two counters set at 0, the writing point being moreover placed against the paper and the driving lever 136 in the "forward" position. The reference of the compass 118, read off by means of one of the two eyepieces 114, is then noted and this reference is noted, for example, on a digital table. The machine is then started up and made to move in such direction as to travel along the edge of the surface to be covered. At the end of this "forward" path, the lever 136 is put in its neutral position and the reference of the compass 118 is again read off by means of the other eyepiece 114 and noted on a second digital table. The machine is then made to effect a half-turn so that it is put, for the return travel, on a line parallel to the line of the forward travel and at a certain distance from the latter line. For this purpose, before the machine moves off, the steering system is turned in the required direction until the index 143 is located on the reference of the dial 149 corresponding to the value of the desired steering diameter. The machine is then made to move while maintaining this predetermined steering position and a complete half-turn is made. At the end of the latter, the utilized zone of the compass, for example the red zone, will have also turned and the block zone will have replaced it in turning slowly through 180°. The reference number read off before effecting the half-turn will then be seen to appear in the second eyepiece utilized and the steering system is put in the straight-ahead position so as to hold the compass stationary on the desired number. The position of the machine is then corrected while travelling slowly in actuating the steering system so as to be exactly located on the reference of the compass. The steering system is then put back in such position that the two lamps 144 are illuminated. If one of them becomes extinguished, a slight correction will be made so that the other illuminates and the two counters are set to 0 before starting up, the two lamps being illuminated at this precise amount. At the end of the trajectory, the two counters 145 are also employed, for putting the steering system back in position, so that they display substantially identical numbers. All of these operations for illuminating the two lamps and setting the two counters to the same number correspond to a turning movement of the steering wheel. At the end of the return path, the procedure is the same as before, but the compass references employed will be those previously noted on the digital tables which must remain the same so that reference will be made thereto at each half-turn by using the corresponding eyepiece.

It will be observed that the recording on a band of paper is above all useful when the path followed describes a curve. On the other hand, in straight lines, the use of the signalling lamps and counters should in principle be sufficient.

It will also be recalled that the direction of displacement of the jacks must be reversed by means of the four-way valves, this reversal being however carried out only at the moment when the two lamps are together illuminated at the end of each forward or return passage.

A last remark concerns the fact that, notwithstanding the advantage derived from the use of a supported wheel in the case of a sliding of the machine on a slope, the orientation of the machine must be resumed by means of the compass after a sliding of a certain large extent as soon as normal operation has been resumed.

By way of a modification, entirely electric circuits may be employed instead of hydraulic circuits, the jacks being for example replaced by electric linear motors.

Complementary means for checking that the half-turns have been appropriately carried out, consists in measuring the first time the length of the straight line traced on the paper during the steering and, the following times, stopping the machine as soon as the considered length has been reached on the paper, since at this point the machine has necessarily been turned through 180°.

It must be understood that the invention is not intended to be limited to the embodiments described hereinbefore and illustrated and that other embodiments and other modifications may be made without departing from the scope of the invention. Thus, for example, a cassette may be employed for the band of paper 132, the driving rollers being in this case placed below the paper and not above and the pressing rollers above the paper. The pivotal support 160 of the jack 151 could also be replaced by a universal joint.

Having now described my invention, what I claim as new and desire to secure by Letters Patent is:

1. An itinerary following device for a vehicle with a driving station and having wheels for contacting the ground, and in particular an automotive vehicle such as an agricultural machine, adapted to permit the vehicle to follow with fidelity in the course of a passage of the vehicle over a given surface, a previously recorded path, said device comprising: recording means for recording the path to be followed and means for comparing the position of the vehicle in the course of its passage with the recorded path for the purpose of actuating steering means for steering the vehicle, and causing the vehicle to be made to travel in the opposite direction relative to the direction of the recorded path, and indicating means for indicating successive directions taken by said vehicle, including a graduated magnetic element, the magnetic element being mounted on the vehicle by a support made from a non-magnetic material and located at a sufficient distance from the metallic mass of the vehicle to ensure that the magnetic influence of the metallic mass is negligible, said indicating means further comprising a viewing means for viewing from said driving station, including a magnifying optical system disposed in front of the graduated magnetic element and at least one viewing element disposed at the driving station.

2. A device as claimed in claim 1, further comprising a plurality of direction detecting means for detecting change in direction of the vehicle and signalling means for signalling deviations of the direction of the vehicle from a straight line under the action of at least one of said direction change detecting means, said signalling means comprising two luminous signalling elements actuated by the direction change detecting means, simultaneously when the detecting means does not detect a direction change and separately and respectively when the detecting means detects a change in direction in one direction or the other.

3. A device as claimed in claim 2, comprising an electrical circuit for supplying current to the two luminous signalling means and having two parallel branches, means defining two conductive surfaces separated from each other by a gap and inserted in said branches, a moving contact movable along said surfaces and connected to the direction change detecting means for closing said circuit, said contact being capable of bridging said gap between the two surfaces when the direction change detecting means does not detect a change in direction.

4. A device as claimed in claim 2, wherein the direction change detecting means comprises an orientable wheel of the vehicle and a remote-drive transmission connecting the signalling means to the direction change detecting means, said signalling means comprising an index which is connected to the direction change detecting means through amplifying means to be movable in front of a reference, the remote-drive transmission further comprising a fluid circuit, a reversing valve and a control jack inserted in said circuit, the control jack being connected to said direction change detecting means.

5. A device as claimed in claim 2, wherein the direction change detecting means comprises an orientable wheel of the vehicle and a remote-drive transmission connects the signalling means to the direction change detecting means, the remote-drive transmission further comprising an electric circuit including a moving contact connected to the control jack and connected to the means to be actuated.

6. A device as claimed in claim 1, further comprising a plurality of direction change detecting means for detecting change in direction of the vehicle, and signalling means for signalling deviations of the direction of the vehicle from a straight line under the action of at least one of said direction change detecting means, said signalling means comprising two counting means so connected as to be actuated by the direction change detecting means separately and respectively when the detecting means detects a change in one direction or the other.

7. A device as claimed in claim 6, wherein the direction change detecting means comprises an orientable wheel of the vehicle and a remote-drive transmission which connects the signalling means to the direction change detecting means, the remote-drive transmission further comprising an electric circuit including a moving contact connected to the control jack and connected to the means to be actuated.

8. A device as claimed in claim 6, comprising an electrical circuit for supplying current to the counting means and having two parallel branches, means defining two conductive surfaces which are separated from each other by a gap and inserted in said branches, a moving contact movable along said surfaces and connected to the direction change detecting means for closing said circuit, said contact being capable of briding the gap separating the two surfaces when the direction change detecting means does not detect a change in direction.

9. A device as claimed in claim 1, further comprising a plurality of direction change detecting means for detecting change in direction of the vehicle, and signalling means for signalling deviations of the direction of the vehicle from a straight line under the action of at least one of said direction change detecting means, said signalling means comprising an index which is connected to the direction change detecting means through amplifying means to be movable in front of a reference, and a remote-drive transmission connecting the signalling means to the direction change detecting means including a fluid circuit, a reversing valve and a control jack connected to the direction change detection means.

10. A device as claimed in claim 1, wherein the direction change detecting means comprises an orientable wheel of the vehicle and a remote-drive transmission connecting the signalling means to the direction change detecting means, and said remote-drive transmission further comprises a fluid circuit, a reversing valve and a control jack in said circuit, connected to said direction change detecting means.

11. A device as claimed in claim 1, comprising means for controlling the steering of the vehicle by the reading element of the recording apparatus with an optical reading means connected to said reading element and connected through an electric control circuit to a motor controlling the steering of the vehicle.

* * * * *